US012722558B2

(12) United States Patent
Armstrong

(10) Patent No.: US 12,722,558 B2
(45) Date of Patent: Sep. 1, 2026

(54) ADJUSTABLE BOW STOP FOR BOAT TRAILER

(71) Applicant: Abraham C. Armstrong, Port Angeles, WA (US)

(72) Inventor: Abraham C. Armstrong, Port Angeles, WA (US)

(*) Notice: Subject to any disclaimer, the term of this patent is extended or adjusted under 35 U.S.C. 154(b) by 0 days.

(21) Appl. No.: 18/733,539

(22) Filed: Jun. 4, 2024

(65) Prior Publication Data

US 2025/0368118 A1 Dec. 4, 2025

(51) Int. Cl.
*B60P 3/10* (2006.01)

(52) U.S. Cl.
CPC .................................. *B60P 3/1033* (2013.01)

(58) Field of Classification Search
CPC ...... B60P 3/1033; B60P 3/1066; B60P 3/1083
See application file for complete search history.

(56) References Cited

U.S. PATENT DOCUMENTS 3,056,520 A * 10/1962 Rutigliano ............ B60P 3/1058 414/479
3,140,003 A 7/1964 Horner
3,414,149 A * 12/1968 Nelson .................. B60P 3/1066 280/43.23
3,458,074 A * 7/1969 Railey ................... B60P 3/1058 414/479
3,938,829 A * 2/1976 Anderson ............. B60P 3/1066 280/414.1
4,623,161 A * 11/1986 Sprague ................ B60P 3/1075 114/344
5,120,079 A 6/1992 Boggs
5,172,928 A 12/1992 Capps
5,273,391 A 12/1993 White
5,417,447 A 5/1995 Godbersen
5,823,559 A * 10/1998 Priesgen ............... B60P 3/1033 280/414.1
7,344,344 B2 3/2008 Davis
8,590,916 B2 * 11/2013 Velton ................... B60P 3/1075 114/44
9,056,574 B2 * 6/2015 Kirchhan .............. B60P 3/1033
10,336,235 B2 7/2019 Schierbaum
11,390,205 B2 * 7/2022 Holker .................. B60P 3/1041
2001/0024026 A1 9/2001 Knutsson
2004/0037686 A1 * 2/2004 Zietlow ................. B60P 3/1066 414/559
2005/0173892 A1 * 8/2005 Terminello ............... B60D 1/46 280/490.1
2011/0008139 A1 1/2011 Hey et al.
2018/0319470 A1 * 11/2018 Williams ............... B62D 13/06
2020/0102009 A1 * 4/2020 Owen .................. B62D 15/028
2021/0001764 A1 * 1/2021 Staples ................. B60P 3/1066
2021/0114694 A1 * 4/2021 Henson ................... B63B 27/36
2022/0134935 A1 * 5/2022 Miller .................. B60P 3/1075 362/477
2022/0355910 A1 * 11/2022 Skutnik ................... B63C 15/00

* cited by examiner

*Primary Examiner* — Valentin Neacsu
*Assistant Examiner* — Abigail R Hymel
(74) *Attorney, Agent, or Firm* — Bold IP PLLC; Christopher Mayle

(57) ABSTRACT

A system and method for an adjustable bow stop for a boat trailer whereby the bow stop may be moved forwards or backward by a powered drive or jack screw whereby the bow stop can be attached to boat trailers allowing the user to move the bow stop roller aft to eliminate the gap between the bow of a vessel and stop after hauling up ramp.

15 Claims, 11 Drawing Sheets

133
131
132
160

160
122
124

160
122
127

128
129
126
142

ADJUSTABLE BOW STOP FOR BOAT TRAILER

FIELD OF DISCLOSURE

The overall field of this invention is a trailer bow stop that eliminates flexing and ensures that weight distribution is correct.

BACKGROUND

A bow stop is a component typically found on boat trailers. Its primary function is to stop the bow (front end) of the boat from moving too far forward when the boat is being loaded onto the trailer. The bow stop is positioned at the end of the trailer closest to the towing vehicle and usually consists of a V-shaped or U-shaped padded bracket. This bracket provides a cushioned stop for the boat, preventing damage to both the boat and the trailer. When a boat is being loaded on a trailer, she floats somewhat level in water. Brought in against the bow stop, she is tight while the trailer is on a sloped ramp down below water. When hauled up the ramp, she rests down on "bunks" of the trailer causing separation of the bow from the bow stop. Thus exists the need for an invention that allows the user to crank the bow stop aft and tighten up against the bow of a vessel to secure safely for transport down a roadway.

BRIEF DESCRIPTION OF DRAWINGS

The present invention will be described by way of exemplary embodiments, but not limitations, illustrated in the accompanying drawings in which like references denote similar elements, and in which.

DETAILED DESCRIPTION

Figure 1:
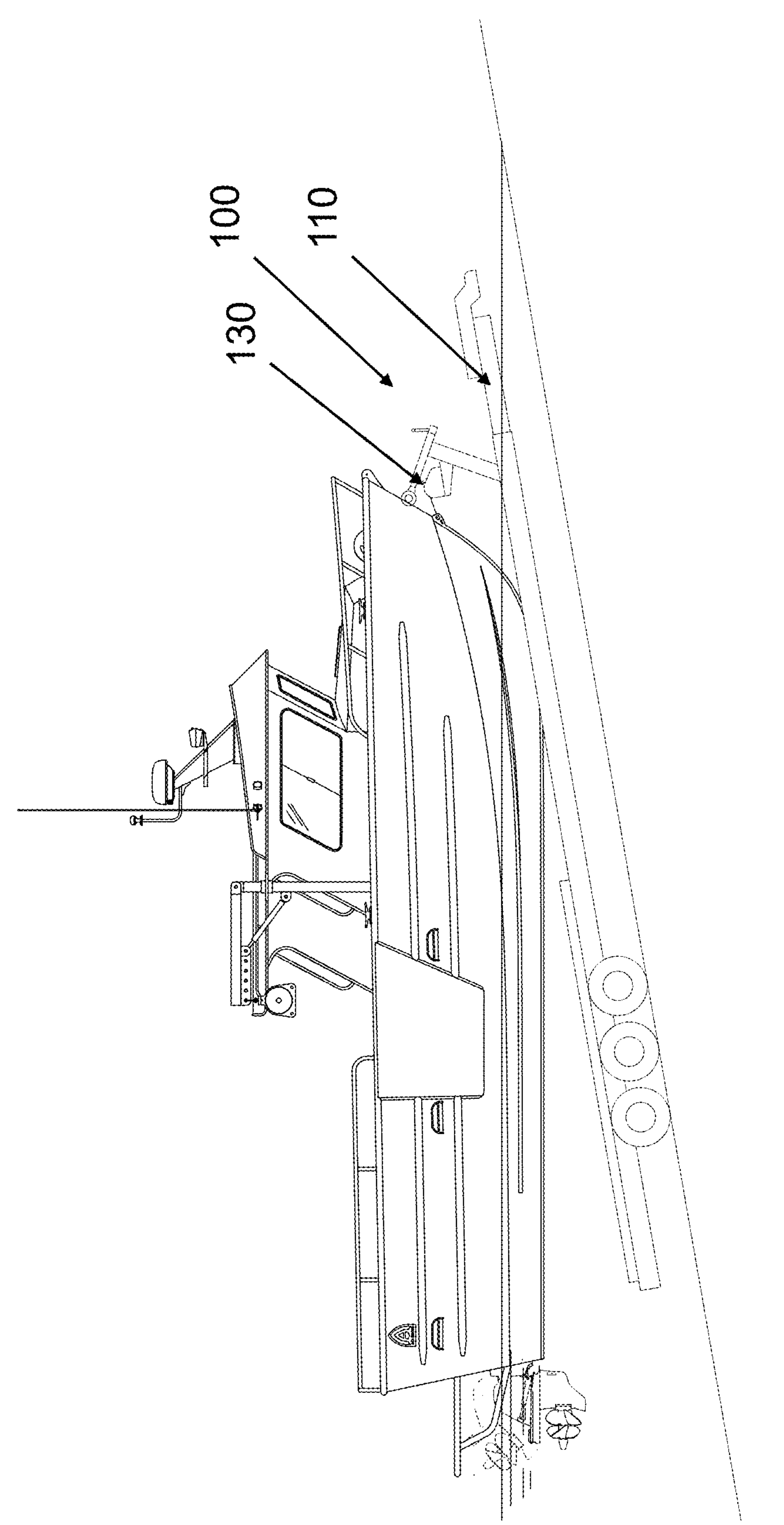
FIG. 1 shows an illustration of the bow stop while the trailer is in the water.
Figure 2:
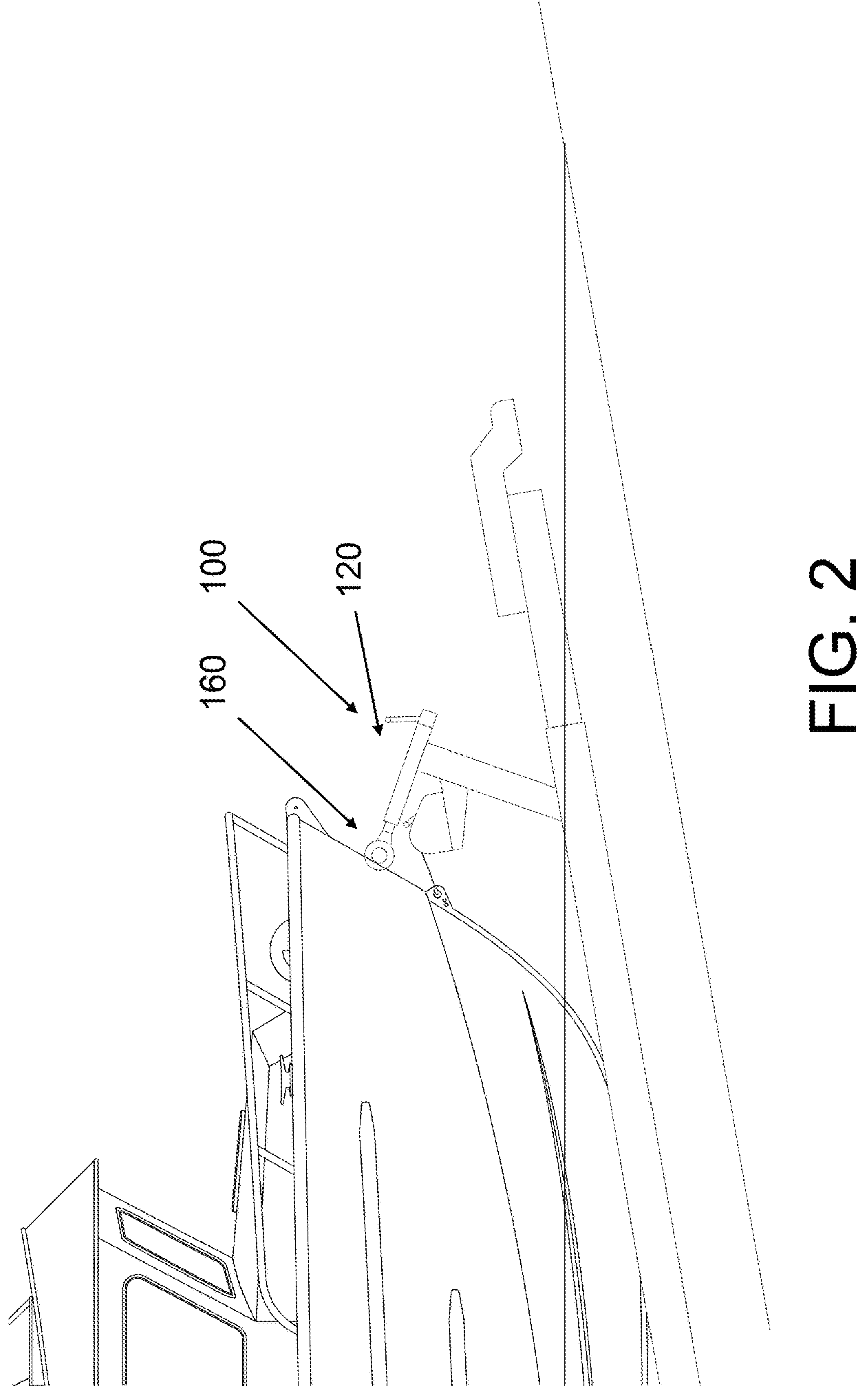
FIG. 2 shows a zoomed in version of the bow stop.
Figure 3:
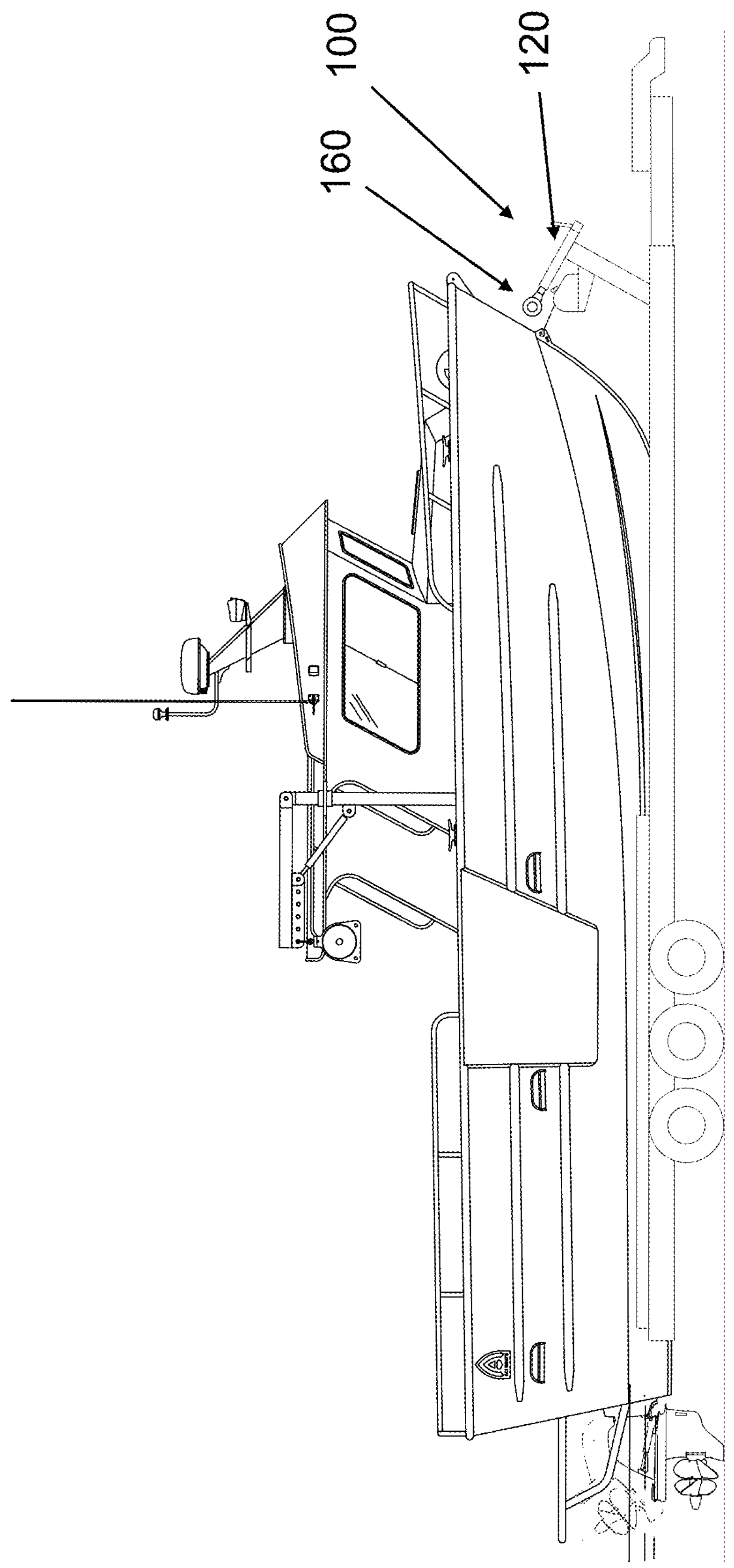
FIG. 3 shows an illustration of the bow stop while the trailer is out of the water.
Figure 4:
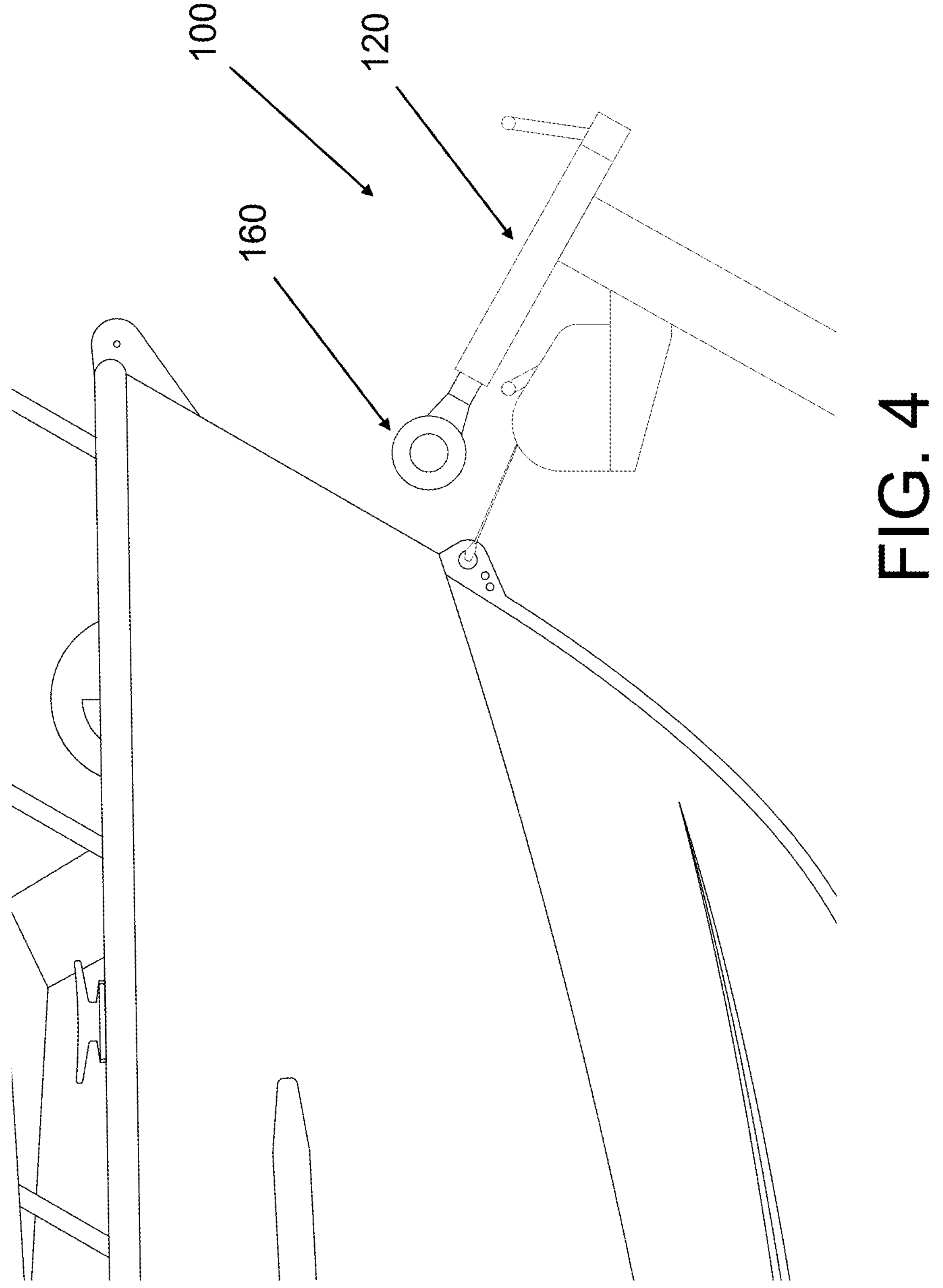
FIG. 4 shows another close-up illustration of the bow stop.
Figure 5:
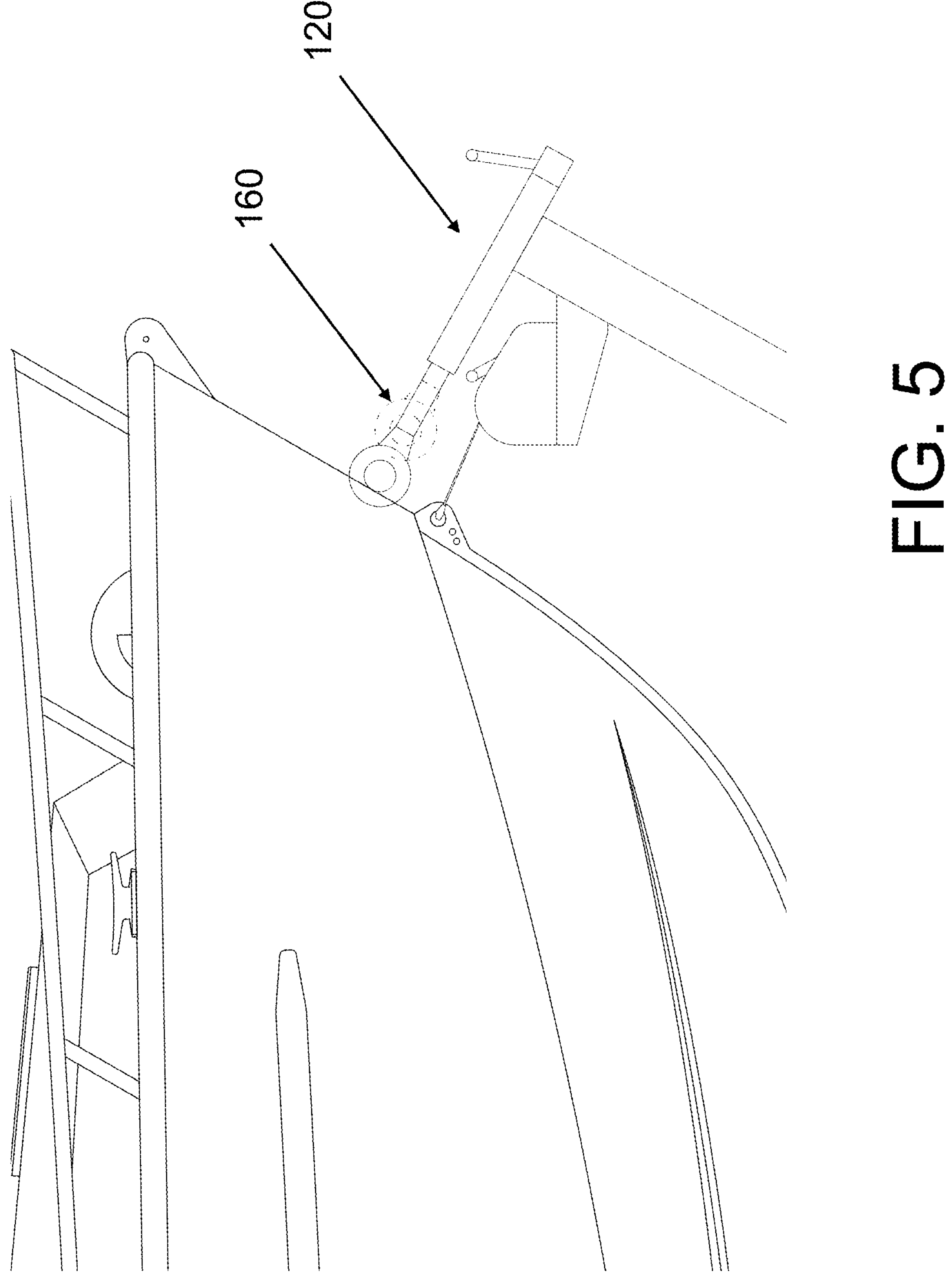
FIG. 5 shows an illustration of the bow stop in movement.
Figure 6:
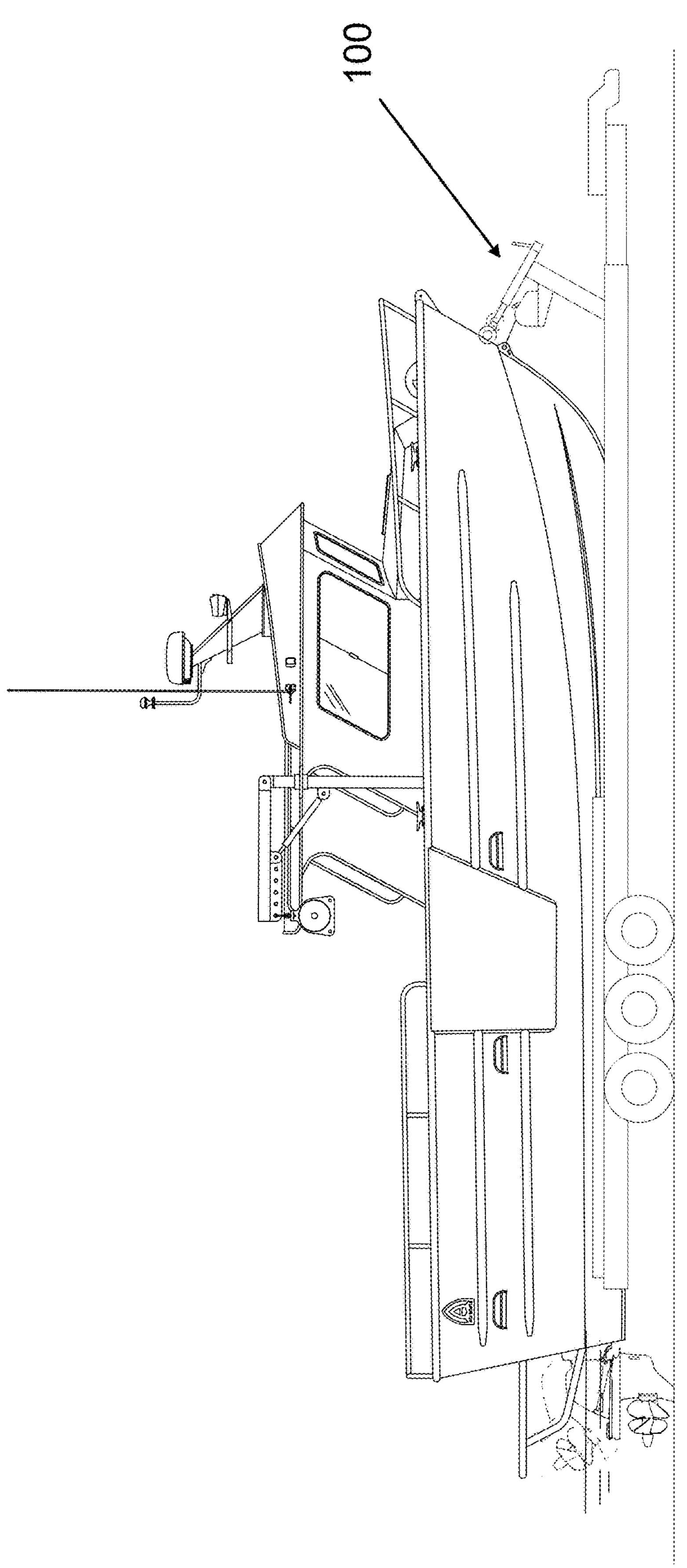
FIG. 6 shows another illustration of the bow stop in movement.
Figure 7:
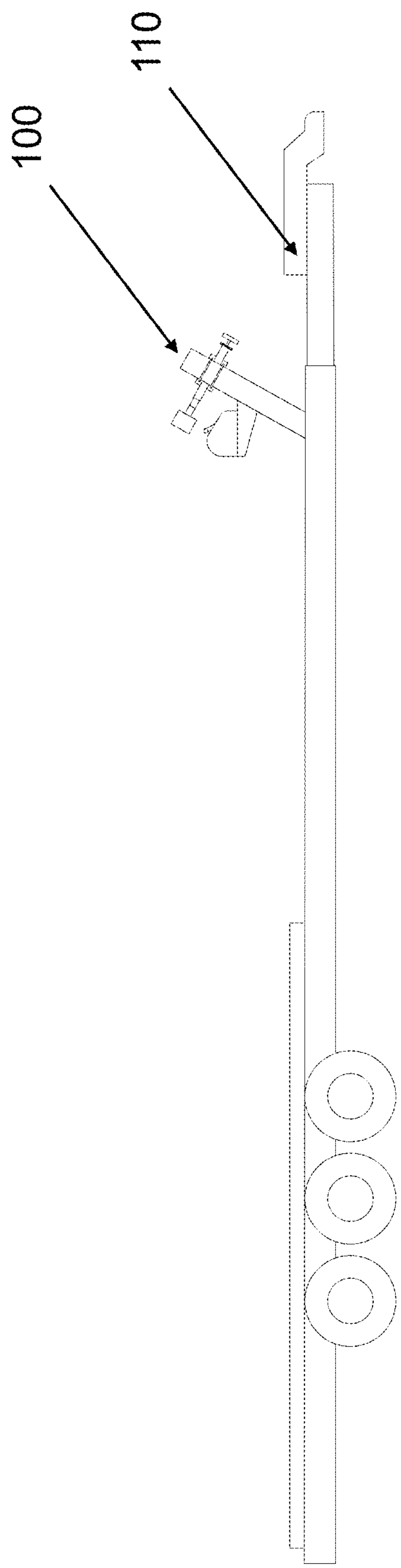
FIG. 7 shows a second embodiment of the bow stop without the boat.

The following description and drawings are illustrative and are not to be construed as limiting. Numerous specific details are described to provide a thorough understanding of the disclosure. However, in certain instances, well-known or conventional details are not described in order to avoid obscuring the description. References to one or another embodiment in the present disclosure can be, but not necessarily are, references to the same embodiment; and, such references mean at least one of the embodiments.

Reference in this specification to "one embodiment" or "an embodiment" means that a particular feature, structure, or characteristic described in connection with the embodiment is included in at least one embodiment of the disclosure. Appearances of the phrase "in one embodiment" in various places in the specification do not necessarily refer to the same embodiment, nor are separate or alternative embodiments mutually exclusive of other embodiments. Moreover, various features are described which may be exhibited by some embodiments and not by others.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks: The use of highlighting has no influence on the scope and meaning of a term; the scope and meaning of a term is the same, in the same context, whether or not it is highlighted. It will be appreciated that the same thing can be said in more than one way.

Consequently, alternative language and synonyms may be used for any one or more of the terms discussed herein. Nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various embodiments given in this specification.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skills in the art to which this disclosure pertains.

The disclosed technology addresses the need for a better system and method to create an adjustable bow stop that can be mounted on existing winch posts. The bow stop can be moved forward or backward (fore and aft) using a hand or power crank. This allows a user 161 to close the gap that forms between the bow of the boat and the bow stop during the process of moving the boat from the water, where it floats while the trailer is on an inclined ramp underwater, to being fully supported on the trailer on land. The system is particularly beneficial for larger boats being loaded onto trailers equipped with bunks, as opposed to smaller boats on trailers with rollers. Rollers can rotate, enabling smaller boats to be pulled forward after being removed from the water. However, for larger boats, which typically use bunks due to their inability to prevent movement forward or backward, this new invention is useful. The friction between the bunks and the boat is intentionally high to prevent the boat from moving easily forward or backward once it is resting on the bunks. Thus, the invention is needed FIGS. 1-7 depict an adjustable bow stop, designated as bow stop 100, designed following the principles of the present invention. Bow stop 100 is meant to be compatible with and attachable to existing trailer winch posts either by using winch 130 already present or as part of a new bow post assembly that includes both adjustable bow stop 100 and winch 130. The connection to trailer 110 is typically achieved using standard "U" bolts or by bolting through. The design allows for bow stop 100 to be adjusted both forward and backward and up and down to accommodate vessels of various sizes. The actual bow stop part may be constructed as either a roller or a V-shaped block and may be connected via a hinged mechanism or simply affixed with a bolt to the innovative adjustable component.

Bow stop 100 may be removably mounted on a winch 130 at the front end of the trailer 110, which is the end closest to the towing vehicle. Bow stop 100 may be positioned over a top of winch 130 by friction fit whereby a hollow section of the bow stop 100 has a slightly larger perimeter or diameter than of the top of winch 130 such that it may be positioned over winch 130. In other non-limiting embodiments, bow stop 100 may have a mounting bracket or be connected by any number of mounting mechanisms or fasteners such as hinges, latches, or adhesive. Bow stop 100 may be positioned so that when the boat is fully loaded onto trailer 110, the bow comes to rest against bow stop 100. Bow stop 100 may be made of sturdy and/or durable materials for multiple uses such as steel.

Bow stop 100 may have an adjusting mechanism 120 that is important for ensuring that the bow stop 100 provides proper support for the specific boat being transported. Bow stop 100 may have a bracket 160 which is the component that comes in contact with the boat. Bracket 160 may be coated with rubber or a similar non-marking, durable material. This coating prevents damage to the boat's hull by providing a cushioned contact point. Bracket 160 may be a V-shaped or U-shaped bracket or square shaped bracket. Bracket 160 may be asymmetrical to fit different shaped boats or ships. This shape helps in centering and stabilizing the boat as it is loaded onto the trailer 110. The V or U shape fits snugly around the front corner of the bow, providing stability and preventing lateral movement. Bracket 160 may be removable such that different types of brackets may be connected depending on the needed use whereby bracket 160 may be connected to the remainder of bow stop 100 by any number of removable fasteners such as one or more hinges, latches, or other brackets.

Bracket 160 may be spring loaded where the sides of the bracket squeeze inward to apply an amount of pressure in a natural mode whereby a user may separate the two sides from one another to fit over the edge of the boat whereby then the sides of the bracket squeeze inward to apply an amount of pressure when the user removes the external force a more precise fit. Bracket 160 may be connected to a hinge such that it may be rotated at an angle to better accommodate the front of the boat and provide a more secure contact. In one or more non-limiting embodiments, there may be multiple brackets 160 that extend upward and downward from bow stop 100 to provide support at multiple points.

Adjusting mechanism 120 may have a jack screw 122 as a type of linear actuator for bracket 160 or any type of other mechanism to move bracket 160 to the aft. The threads on jack screw 122 may be designed to convert the smaller, circular motion of turning the screw into a larger linear movement along the screw's axis. Jack screw 122 may include a long-threaded shaft whereby when the shaft rotates, jack screw 122 translates the rotational motion into linear motion.

Figures 8A, 8B, 8C, 8D:
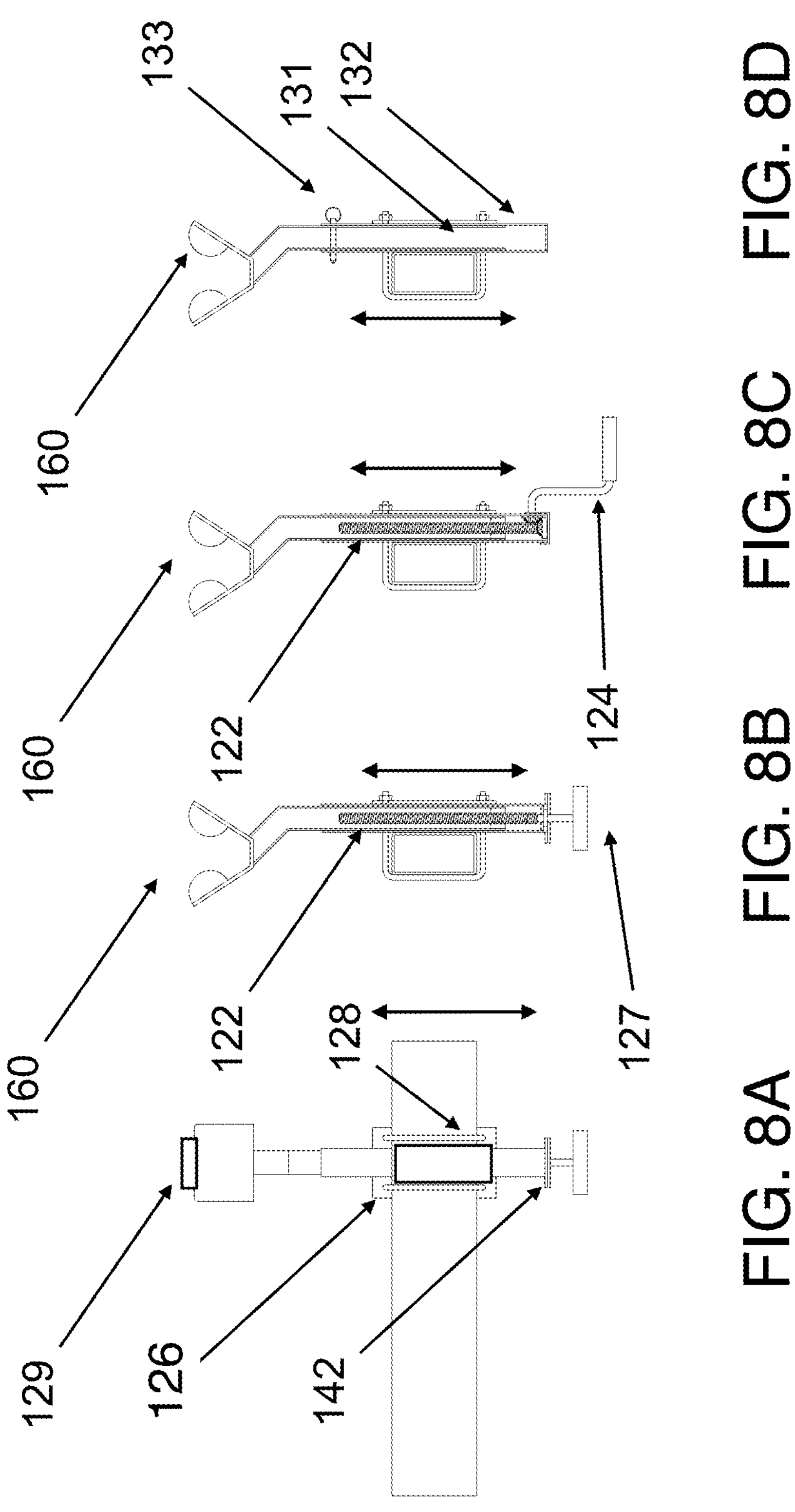
FIG. 8A-D shows a top view of different versions of the jack screw of the bow stop.

FIG. 8C illustrates a top view of some embodiments of adjusting mechanism 120. In one example, a crank 124 may be attached to the distal end of jack screw 122 and mounted on the frame of bow stop 100. Crank 124 is a lever-like handle that provides the mechanical advantage needed to turn jack screw 122. By rotating crank 124, a user 161 may manually apply rotational force to jack screw 122. Adjusting mechanism 120 may include bearings or guides to ensure smooth operation and to withstand any forces applied during movement. As crank 124 turns jack screw 122, bracket 160 attached to jack screw 122 by a nut that travels along the screw moves linearly as illustrated by the double-sided arrow. This movement may be either forward or backward along the axis of the screw, depending on the direction of the crank's rotation thus causing bracket 160 to move forward or backward.

In another example, as illustrated in FIG. 8B, a knob 127 may be attached to the distal end of jack screw 122 and mounted on the frame of bow stop 100. In another example, as illustrated in FIG. 8D, adjusting mechanism 120 may have an inner component 131 and outer component 132 whereby the outer component 132 may move relative to the inner component 131. The upward motion of outer component 132 relative to inner component 131 shortens the member whilst a downward motion of outer component 132 relative to inner component 131 lengthens bow stop 100. Adjusting mechanism 120 may have a latch mechanism 133 to adjust the length of bow stop 100 and then secure the length such that a user 161 may adjust the length of bow stop 100 to accommodate for varying distances.

In other non-limiting embodiments, as illustrated in FIG. 8A adjusting mechanism 120 may have a motor-powered jack screw 142 that converts rotational motion into linear motion using a screw mechanism. Adjusting mechanism 120 may include an electric motor 126 that provides the power for jack screw 122. Electric motor 126 may be any number of AC, DC, stepper, or servo motors, depending on the application and control requirements and have a drive mechanism 128 that connects the motor to the screw. Drive mechanism 128 may include gears or belts to transfer motor's 126 rotational force to jack screw 122.

When motor 126 is activated, it rotates jack screw 122. The rotational motion of jack screw 122 is converted into linear motion through the threads. As jack screw 122 turns, the nut moves along the length of the screw. The movement of the nut either causes bracket 160 to move forward or backward, depending on the direction of the motor's 126 rotation.

Figure 11:
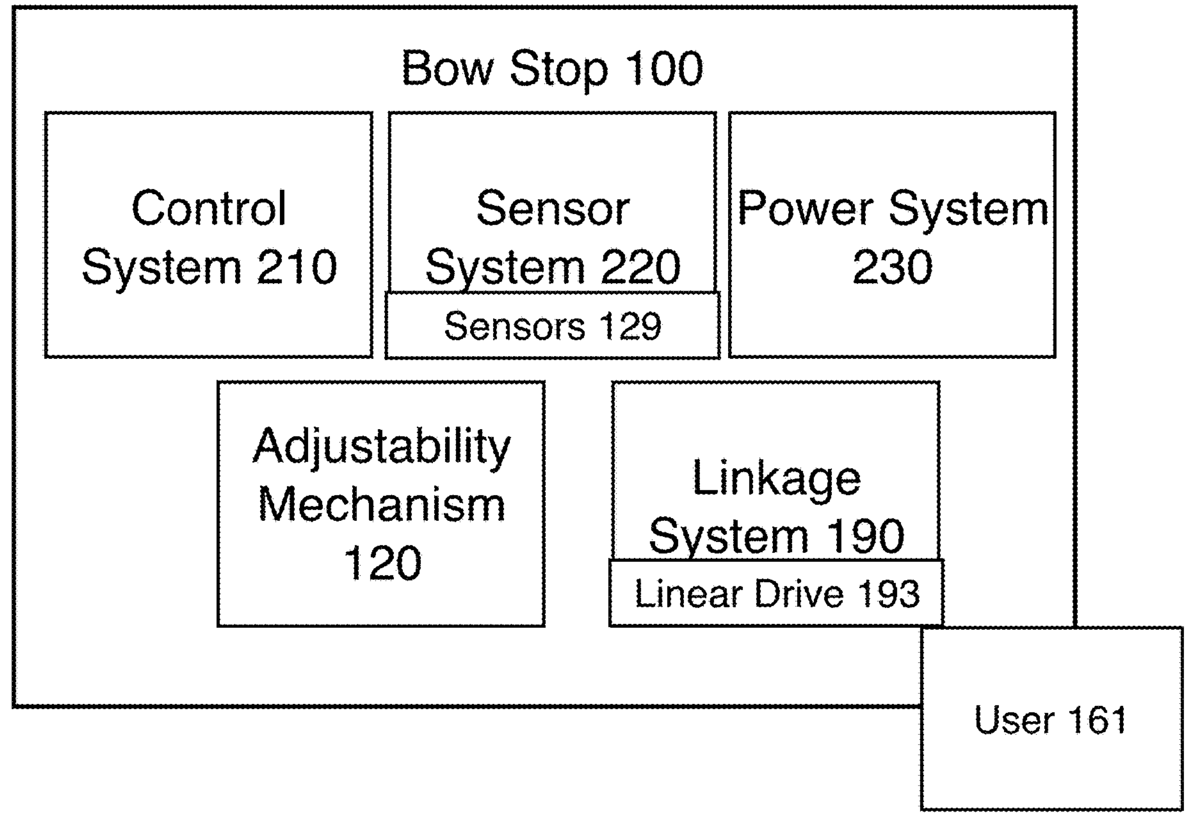
FIG. 11 illustrates a block diagram of the bow stop.

In this embodiment and as well as the other embodiments, adjusting mechanism 120 may have a series of subcomponents to operate bow stop 100 automatically, as illustrated in FIG. 11.

Bow stop 100 may utilize a power system 230 that provides the power to sensor system 220, the circuits and components of control system 210, as well as any drive system during control and movement. Power system 230 may be powered by methods known by those of ordinary skill in the art. In some embodiments, power system 230 may include a rechargeable battery pack whereby the rechargeable battery is of a charge, design, and capacity, to provide sufficient power.

Bow stop 100 may utilize a control system 210 to control the actuation of the other systems. Control system 210 may have a series of computing devices. Control system 210 may be in the form of a circuit board, a memory, or other non-transient storage medium in which computer-readable coded instructions are stored and one or more processors configured to execute the instructions stored in the memory. Control system 210 may have a wireless transmitter, a wireless receiver, and a related computer process executing on the processors.

Computing devices of control system 210, may be any type of computing device that typically operates under the control of one or more operating systems, which control scheduling of tasks and access to system resources. Computing devices may be a phone, tablet, television, desktop computer, laptop computer, networked router, networked switch, networked bridge, or any computing device capable of executing instructions with sufficient processor power and memory capacity to perform operations of control system 210.

The one or more computing devices may be integrated into control system 210, while in other non-limiting embodiments, control system 210 may be a remotely located computing device or server configured to communicate with one or more other control systems 210. Control system 210 may also include an internet connection, network connection, and/or other wired or wireless means of communication (e.g., LAN, etc.) to interact with other components. The connection allows for updating, controlling, sending/retrieving information, monitoring, or otherwise interacting passively or actively with control system 210.

Control system 210 may include control circuitry and one or more microprocessors or controllers acting as a servo control mechanism capable of receiving input from one or more sensors, analyzing the input from the one or more sensors, and generating an output signal to the various systems. The microprocessors (not shown) may have on-board memory to control the power that is applied to the various systems.

Control system 210 may include circuitry to provide an actuable interface for user 161 to interact with, including switches and indicators and accompanying circuitry for an electronic control panel or mechanical control panel. Such an actuable interface may present options to select from. Control system 210 may be preprogrammed with any reference values, by any combination of hardwiring, software, firmware to implement various operational modes including but not limited to temperature, light, and humidity values.

Bow stop 100 may include a sensor system 220 having one or more sensors 129, which may include a plurality of detectors mounted or otherwise connected to bow stop 100 or other components of the trailer. In one non-limiting embodiment, sensor system 220 may have infrared ("IR") detectors having photodiodes and related amplification and detection circuitry. In other embodiments, radio frequencies, magnetic fields, and ultrasonic sensors, temperature sensors, pressure sensors, humidity sensors, or other types of sensors and transducers may be employed. Detectors may be arranged in any number of configurations and arrangements.

Sensors 129 may be arranged in any number of configurations and arrangements on the housing of bow stop 100. Sensors 129 may also be in the form of impact sensors that are triggered when bow stop 100 comes into contact with the boat. The impact detectors send a signal through a control system 210 to the microprocessors containing an input value. The microprocessors then compare the received input value using a comparison function and evaluate the input data against a setting or expectation of a certain reference value stored within the memory of the control system. If the calculated value is outside the expected reference value, the microprocessors then send a signal through the control system commanding bracket 160 to stop, resting against the boat.

Figure 9:
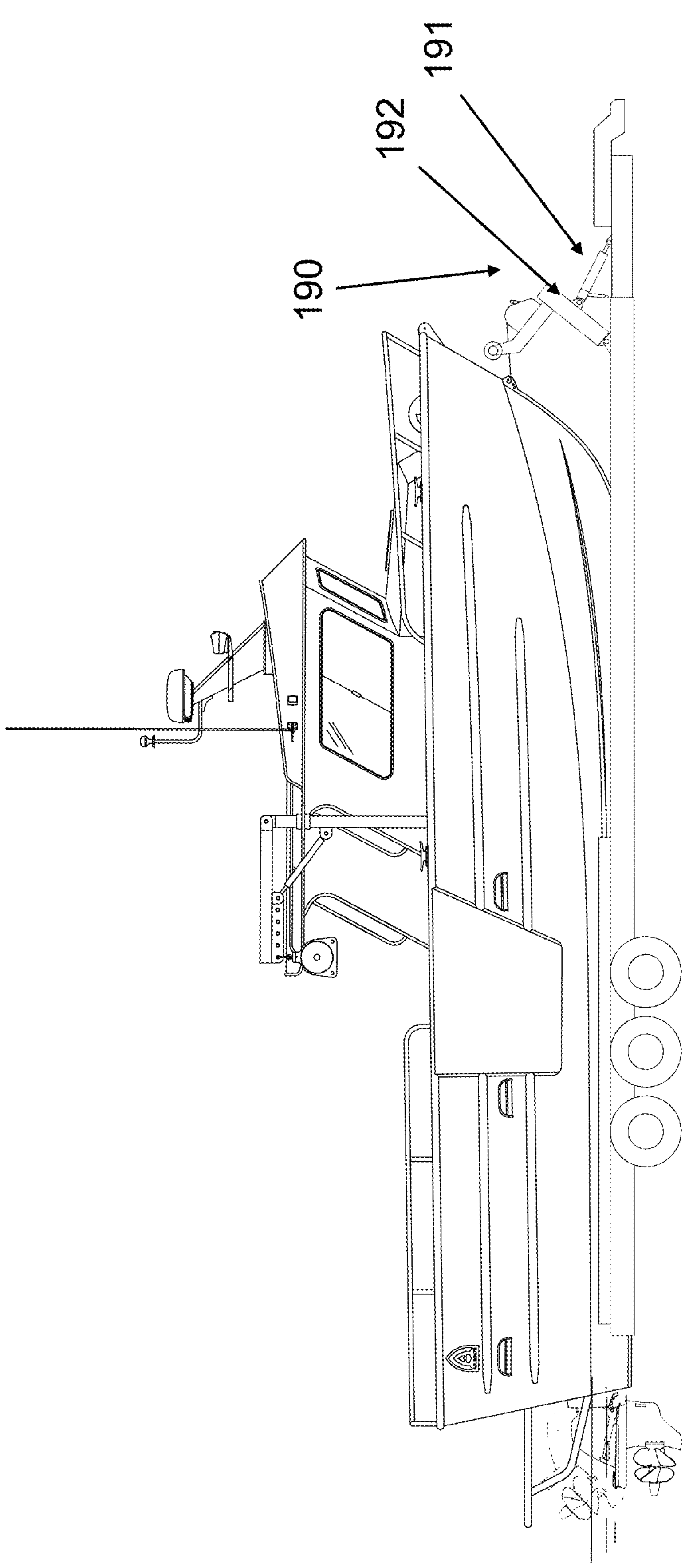
FIG. 9 shows a third embodiment of the bow stop with an actuator system.
Figure 10:
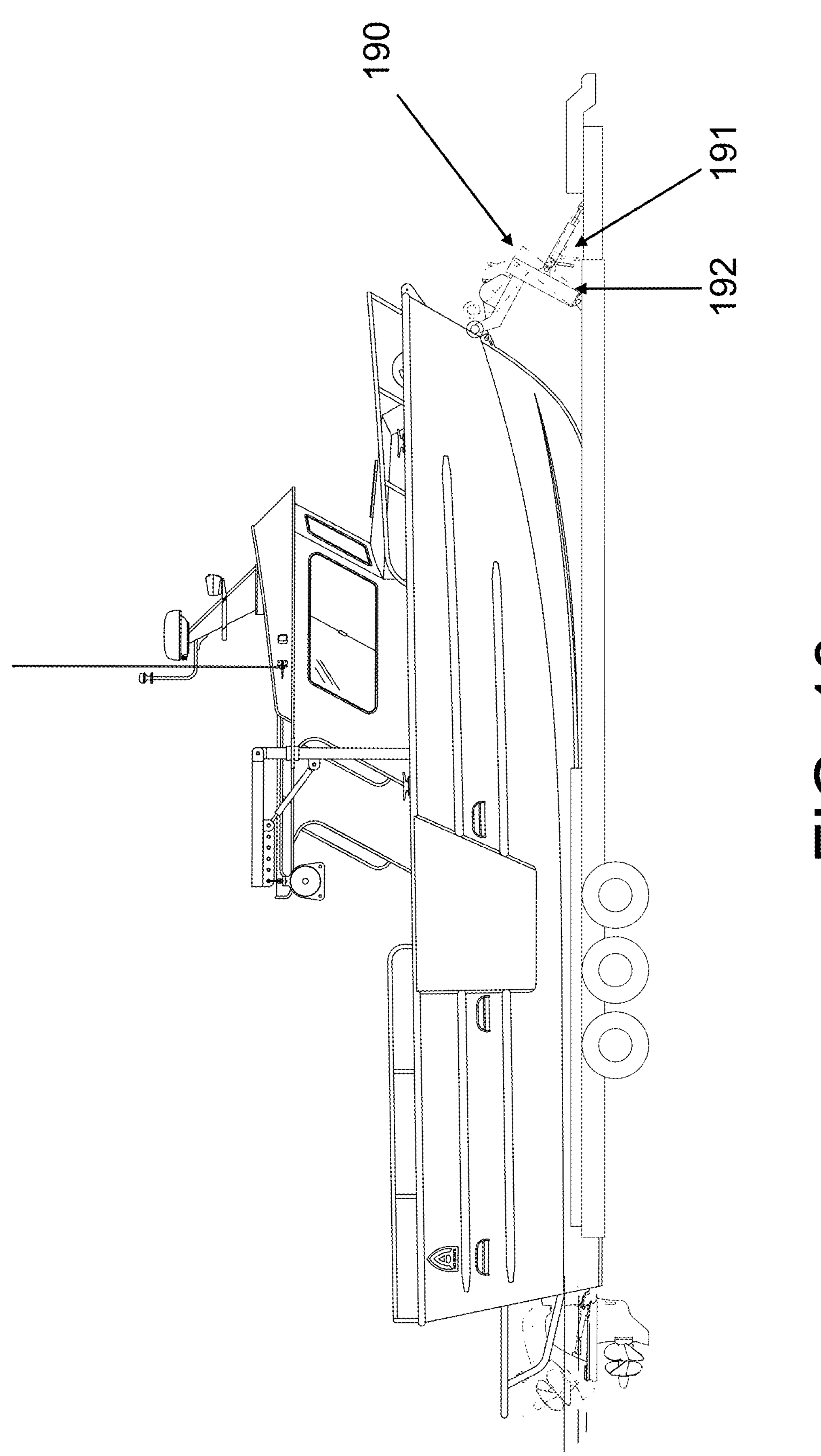
FIG. 10 shows the third embodiment of the bow stop in movement.

In more non-limiting embodiments, bow stop 100 may be removably mounted to another point of the trailer whereby the winch may be positioned on top of the linkage system or the linkage system may be separate from the winch, whereby bow stop 100 may have an adjustable, articulated arm or linkage system 190, as illustrated in FIG. 9 and FIG. 10 and FIG. 11. Adjustable linkage system 190 may be attached to the end of a linear drive system 193 with a linear drive 191 by one component of the system of linkages and used to convert linear motion into angular motion. Linear drive 191 may be at a first acute angle with the horizontal surface of the trailer and include an actuator having a motor (electric, hydraulic, or pneumatic) which drives a screw, belt, or rack and pinion system. The linear movement created by this component may be controlled to adjust the extent and speed of the motion. Adjustable linkage system 190 may include joints and connecting rods that can extend, pivot, and rotate the object attached to the end of the actuator. For example, as illustrated in FIGS. 9 and 10, there may be a component 192 with the adjusting mechanism, whereby a distal end of linear drive 191 is connected along a length of component 192. The design of the linkage determines the direction and angle of the rotation, allowing the object to not only lift upward but also extend outward at a predetermined angle.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description but is not intended to be exhaustive or limited to the invention in the form disclosed. Many modifications and variations will be apparent to those of ordinary skill in the art without departing from the scope and spirit of the invention.

The embodiments were chosen and described in order to best explain the principles of the invention and the practical application, and to enable others of ordinary skill in the art to understand the invention for various embodiments with various modifications as are suited to the particular use contemplated. The present invention according to one or more embodiments described in the present description may be practiced with modification and alteration within the spirit and scope of the appended claims. Thus, the description is to be regarded as illustrative instead of restrictive of the present invention.

What is claimed is:

1. An adjustable bow stop for a boat trailer, comprising:

a frame;

a bracket; and an adjustable mechanism carried on the frame and configured to linearly translate the bracket along the frame in a fore and aft direction relative to the boat trailer wherein the frame is configured to be positioned over a top of an existing winch post of the boat trailer such that the adjustable mechanism operates from atop the existing winch post; and a mounting system configured to attach the adjustable bow stop to the boat trailer, wherein the mounting system is configured to removably mount the adjustable bow stop to the existing winch post.

2. The adjustable bow stop of claim 1, wherein the adjustable mechanism includes a jack screw connected to the bracket.

3. The adjustable bow stop of claim 2, wherein the bracket is removable.

4. The adjustable bow stop of claim 3, wherein the bracket is u shaped.

5. The adjustable bow stop of claim 3, wherein the bracket is v shaped.

6. The adjustable bow stop of claim 2, wherein the adjustable bow stop includes one or more sensors.

7. The adjustable bow stop of claim 6, wherein the one or more sensors are impact sensors.

8. The adjustable bow stop of claim 2, further comprising an adjustable, articulated arm coupled between the mounting system and the adjustable mechanism.

9. The adjustable bow stop of claim 1, wherein the bow stop is secured to the winch by friction fit.

10. The adjustable bow stop of claim 1, wherein the adjustable mechanism comprises: an inner component; an outer component movably coupled to the inner component, wherein relative motion between the inner component and the outer component adjusts a length of the adjustable bow stop.

11. The adjustable bow stop of claim 10, wherein the adjustable mechanism has a latch mechanism configured to secure the outer component relative to the inner component at a selected length.

12. An adjustable bow stop system, comprising: a winch post mounted on a forward end of a boat trailer; and an adjustable bow stop removably mounted to the winch post, the adjustable bow stop comprising: a bracket configured to contact a bow of a boat; an adjusting mechanism coupled to the bracket and configured to move the bracket in a fore and aft direction relative to the boat trailer; and a control system configured to control operation of the adjusting mechanism, wherein the adjusting mechanism comprises a jack screw, wherein the adjustable bow stop system comprises a sensor system configured to detect contact between the bracket and the bow of the boat, wherein the control system is configured to stop movement of the bracket in response to detected contact.

13. The adjustable bow stop system of claim 12, wherein the adjustable bow stop further comprises an articulated arm coupled between the winch post and the adjusting mechanism, the articulated arm configured to allow vertical and horizontal adjustment of the bracket relative to the winch post.

14. An adjustable bow stop for a boat trailer, comprising:
- a frame;
- a bracket;
- an adjustable mechanism configured to move the bracket in a fore and aft direction relative to the boat trailer; and a mounting system configured to attach the adjustable bow stop to the boat trailer, wherein the adjustable mechanism includes a jack screw connected to the bracket; and
- an adjustable, articulated arm coupled between the mounting system and the adjustable mechanism.

15. An adjustable bow stop for a boat trailer, comprising:
- a frame configured to be positioned over a top of an existing winch post of the boat trailer;
- a bracket;
- a mounting system configured to attach the adjustable bow stop to the boat trailer, wherein the mounting system is configured to removably mount the adjustable bow stop to the existing winch post; and
- an adjustable mechanism carried on the frame and with an adjuster configured to linearly translate the bracket in a fore and aft direction relative to the boat trailer from a first configuration to a second configuration that closes a formed gap between a bow of a boat and the adjustable bow stop by moving the adjustable bow stop towards the boat.

* * * * *